May 5, 1953 G. W. JOHNSON 2,637,066
POULTRY CHILLING APPARATUS
Filed June 13, 1949 2 SHEETS—SHEET 1

INVENTOR,
Gordon W. Johnson.
BY Roy E. Hamilton,
Attorney.

May 5, 1953

G. W. JOHNSON 2,637,066

POULTRY CHILLING APPARATUS

Filed June 13, 1949

INVENTOR,
Gordon W. Johnson.
BY
Roy E. Hamilton,
Attorney.

Patented May 5, 1953

2,637,066

UNITED STATES PATENT OFFICE 2,637,066

POULTRY CHILLING APPARATUS

Gordon W. Johnson, Raytown, Mo., assignor to Gordon Johnson Company, Kansas City, Mo., a corporation of Missouri Application June 13, 1949, Serial No. 98,859

3 Claims. (Cl. 17—11)

This invention relates to new and useful improvements in poultry chilling apparatus, and has particular reference to apparatus of the cold water bath type.

The principal object of the present invention is the provision of a poultry chilling apparatus comprising a tank adapted to contain cold water or the like, and novel means for raising and lowering poultry into said tank.

Another object is the provision of a poultry chilling apparatus of the class described having a broad flexible belt secured along one edge of said tank and passing around a drum at the opposite edge of the tank, whereby when said belt is unreeled from said drum, said belt, and any material supported thereon will be lowered into said tank.

A further object is the provision of a poultry chilling apparatus of the class described above wherein the flexible belt is of open mesh construction, whereby cracked ice or the like will fall through the belt into the tank when the poultry is raised from the tank.

Other objects are simplicity and economy of construction, ease and efficiency in handling heavy loads, and adaptability to handle various types of material other than poultry.

With these objects in view, as well as other objects which will appear in the course of the specification, reference will be had to the drawing, wherein.

Figure 1:
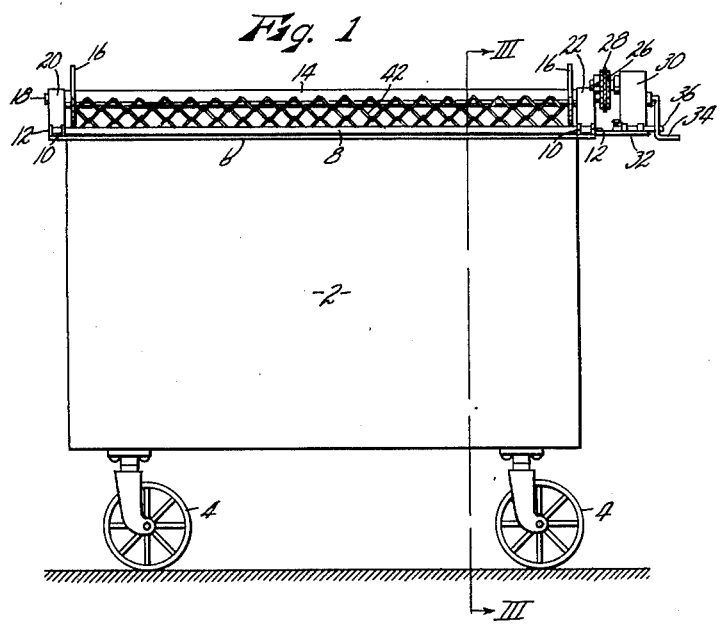
Figure 1 is a front elevation of a poultry chilling device embodying the present invention.
Figure 2:
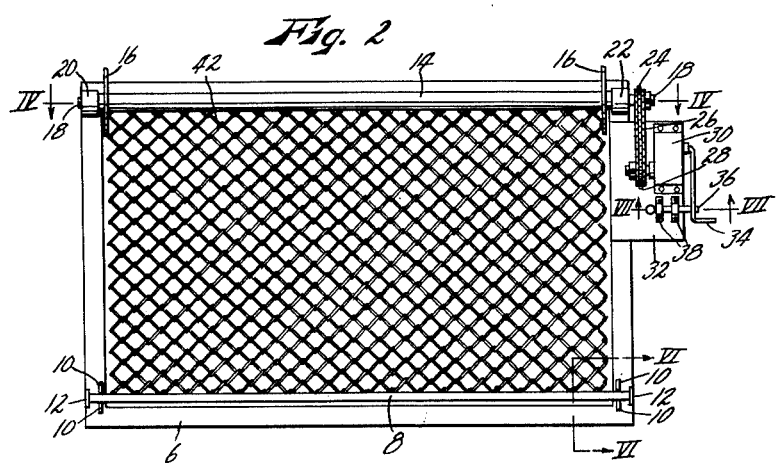
Fig. 2 is a plan view of the device.
Figure 3:
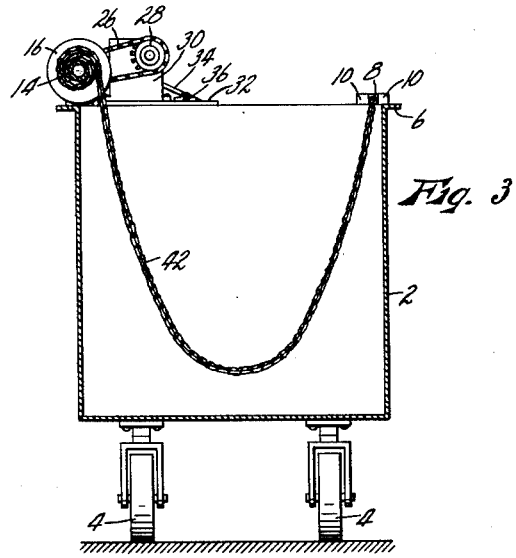
Fig. 3 is a sectional view taken on line III—III of Fig. 1, with the belt partially wound on the drum.
Figure 7:
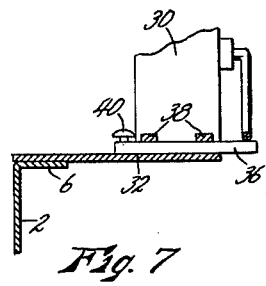
Fig. 7 is an enlarged fragmentary section taken on line VII—VII of Fig. 2.

Like reference numerals apply to similar parts throughout the several views, and the numeral 2 applies to a preferably rectangular tank open at the top and supported by a plurality of floor-engaging castered wheels 4. Said tank is formed to present an outwardly turned flange 6 extending around the upper edge thereof. A shaft 8 is disposed across the top of said tank adjacent one edge thereof, the end portions of said shaft resting on flange 6. Stops 10 fixed to said flange prevent lateral movement of the shaft and stops 12 fixed to said flange prevent longitudinal movement of the shaft. Said shaft is thereby adapted to oscillate axially.

A drum 14 having rigidly fixed end discs 16 is disposed across the top of tank 2 along the edge thereof opposite shaft 8. At its respective ends said drum is provided with stub axles 18 which are carried rotatably in bearings 20 and 22 fixed to flange 6 of the tank. To the outwardly extended end of shaft 18 adjacent bearing 22 is fixed a sprocket 24, said sprocket being operatively connected by means of chain 26 with sprocket 28. Sprocket 28 is mounted on the output shaft of gear reduction unit 30, which is mounted securely on a plate 32 fixed to tank flange 6. Said gear reduction unit is manually operable by means of a hand crank 34. A stop rod 36 is carried slidably on the upper surface of plate 32 in keepers 38, and is provided with a handle 40 by means of which the stop rod may be moved into or out of the path of crank 34.

Figure 4:
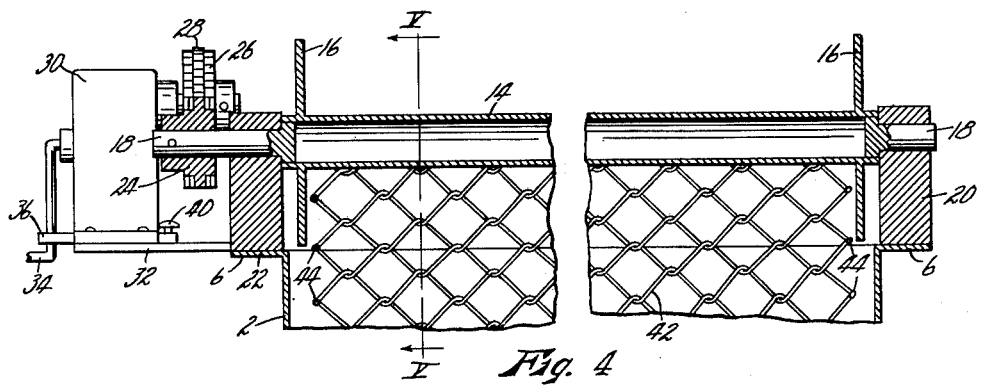
Fig. 4 is an enlarged and foreshortened fragmentary sectional view taken on line IV—IV of Fig. 2.
Figure 5:
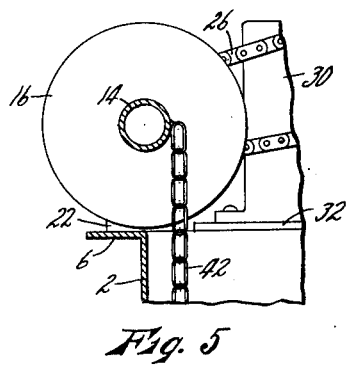
Fig. 5 is a fragmentary section taken on line V—V of Fig. 4.
Figure 6:
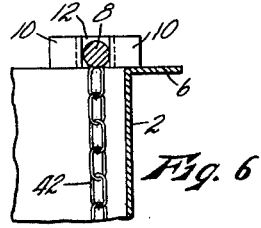
Fig. 6 is an enlarged fragmentary sectional view taken on line VI—VI of Fig. 2.

A flexible belt 42 extends across tank 2, being secured along one end to shaft 8, and along its opposite end to drum 14. Said belt is of such length that when it is unreeled from drum 14 it will hang downwardly into tank 2 and lie along the bottom thereof. When the belt is reeled on drum 14, it is elevated from the tank, and extends more or less straight between the drum and shaft 8. It will be noted that belt 42 comprises a plurality of wires disposed transversely of the belt, each of said wires having substantially the form of a helix partially flattened out present a generally zig-zag shape, as best shown in Figs. 4 to 6. Each of the wires is interengaged with the adjacent wires, and the corresponding ends of each successive pair of wires are welded together as at 44. Thus a belt is formed having in effect links which are very short longitudinally of the belt but which extend the full width of the belt. This provides the necessary flexibility for permitting the belt to be rolled on the drum.

In operation, the tank is first filled with water and cracked ice or the like, and belt 42 is rolled on drum 14 by turning crank 34, after moving stop rod 36 out of the path of said crank. Dressed poultry is then laid on the belt, and crank 34 is turned to lower the poultry into the iced water. More poultry may then be placed in position, and the belt lowered still farther into the tank, until the entire tank is substantially full. Thus the poultry may be positioned carefully one bird at a time, even in a deep tank, thereby eliminating damage to the poultry which would result from dropping or throwing it into the tank. When it is desired to remove the poultry from the tank, crank 34 is reversed and turned to reel belt 42 on drum 14. The gear reduction unit 30 may be such that a single man may handle a very heavy mass of poultry. It is, however, apparent that drum 14 could be driven by a motor or other power unit if desired. As the belt is taken up by drum 14, the poultry will gradually be lifted above the surface of the iced water, and it may be removed one fowl at a time. This eliminates the necessity of the operator reaching into the ice water to remove the poultry therefrom, and permits a single operator to handle a much deeper and larger tank. As the belt is raised above the level of the water in the tank, the water and ice will pass through the openings in said belt. The size of said openings may be varied according to the size of the poultry or other material to be handled. Constructing the belt of wire has the advantages of provising maximum strength with minimum area, and adaptability to be treated to resist corrosion by water and by the bodily fluids of the poultry. The belt is secured to shaft 8 and drum 14 by welding, but other fastening would be used. As shown in Fig. 5, the belt is fixed to drum 14 substantially tangentially, in order to facilitate winding of the belt on the drum. The oscillation of shaft 8 permits the chain to assume any angle with respect to the horizontal at its line of connection with said shaft, thereby eliminating bending strains in the chain link adjacent said shaft.

While I have shown a specific embodiment of my invention, it is apparent that many minor variations of construction and operation could be made without departing from the spirit of the invention.

What I claim is:

1. In poultry chilling apparatus, an elongated, open top tank; an elongated member rotatably carried by the tank in parallelism with the longitudinal axis of the tank adjacent the open top thereof; and a belt adapted to receive alternate, relatively superimposed layers of flaked ice and poultry, said belt connecting the member and the tank and being adapted to depend from the open top of the tank in a loop within the tank, said belt comprising a number of metallic wires extending longitudinally of the tank, each provided with a number of loops, the loops of the wires at one edge of the belt being rigidly joined to the member throughout the length thereof, said loops all being spirally interconnected, presenting hinge connections to render the belt flexible for winding on said member to a taut condition completely covering said open top of the tank between the member and one edge of the tank when said member is rotated in one direction to raise said layers toward said open top of the tank, and presenting a plurality of openings throughout the belt, smaller than said poultry, but adapted to permit passage of said flaked ice therethrough into the tank as the layers are raised to the level of said open top of the tank and the poultry removed therefrom.

2. In poultry chilling apparatus, an elongated, open top tank; a pair of spaced, elongated members carried by the tank in parallelism with the longitudinal axis of the tank adjacent the open top thereof, one of the members being rotatable; a belt adapted to receive alternate, relatively superimposed layers of flaked ice and poultry, said belt connecting the members and being adapted to depend therefrom in a loop within the tank, said belt comprising a number of metallic wires extending longitudinally of the tank, each provided with a number of loops, the loops of the wires at two edges of the belt being rigidly joined to the members throughout the lengths thereof, said loops all being spirally interconnected, presenting hinge connections to render the belt flexible for winding on said one member to a taut condition completely covering the open top of the tank between the members when said one member is rotated in one direction to raise said layers toward said open top of the tank, and presenting a plurality of openings throughout the belt, smaller than said poultry, but adapted to permit passage of said flaked ice therethrough into the tank as the layers are raised to the level of said open top of the tank and the poultry removed therefrom; and open top stop means on the tank for mounting the other member and rendering the same readily detachable, whereby the belt may be moved clear of said open top of the tank.

3. In poultry chilling apparatus, an elongated, open top tank; a pair of spaced, elongated members rotatably carried by the tank in parallelism with the longitudinal axis of the tank adjacent the open top thereof; a belt adapted to receive alternate, relatively superimposed layers of flaked ice and poultry, said belt connecting the members and being adapted to depend therefrom in a loop within the tank, said belt comprising a number of metallic wires extending longitudinally of the tank, each provided with a number of loops, the loops of the wires at two edges of the belt being rigidly joined to the members throughout the lengths thereof, said loops all being spirally interconnected, presenting hinge connections to render the belt flexible for winding on one of the members to a taut condition completely covering the open top of the tank between the members when said one member is rotated in one direction to raise said layers toward said open top of the tank, and presenting a plurality of openings throughout the belt, smaller than said poultry, but adapted to permit passage of said flaked ice therethrough into the tank as the layers are raised to the level of said open top of the tank and the poultry removed therefrom; open top stop means on the tank for rotatably mounting the other member and rendering the same readily detachable, whereby the belt may be moved clear of said open top of the tank; a gear reduction unit having its output shaft operably connected with said one member; and means for turning the input shaft of said gear reduction unit.

GORDON W. JOHNSON.

References Cited in the file of this patent

UNITED STATES PATENTS

| Number | Name | Date |
|---|---|---|
| 378,670 | Fletcher | Feb. 28, 1888 |
| 507,903 | Hancock | Oct. 31, 1893 |
| 752,506 | Bartlett | Feb. 16, 1904 |
| 766,742 | Swinscoe | Aug. 2, 1904 |
| 2,405,157 | McKee | Aug. 6, 1946 |